(12) United States Patent
Ohm (10) Patent No.: US 12,123,417 B2
(45) Date of Patent: Oct. 22, 2024

(54) IDEAL PUMP STAGING CONTROL

(71) Applicant: Optimum Energy Co, LLC, Seattle, WA (US)

(72) Inventor: Jesse Ohm, Media, PA (US)

(73) Assignee: Optimum Energy Co, LLC, Seattle, WA (US)

( * ) Notice: Subject to any disclaimer, the term of this patent is extended or adjusted under 35 U.S.C. 154(b) by 326 days.

(21) Appl. No.: 17/044,778

(22) PCT Filed: Apr. 2, 2019

(86) PCT No.: PCT/US2019/025263
§ 371 (c)(1),
(2) Date: Oct. 1, 2020

(87) PCT Pub. No.: WO2019/195203
PCT Pub. Date: Oct. 10, 2019

(65) Prior Publication Data
US 2021/0108642 A1    Apr. 15, 2021

Related U.S. Application Data

(60) Provisional application No. 62/651,358, filed on Apr. 2, 2018.

(51) Int. Cl.
*F04D 15/00* (2006.01)
*F04D 13/12* (2006.01)
*G05B 13/02* (2006.01)

(52) U.S. Cl.
CPC ......... *F04D 15/0066* (2013.01); *F04D 13/12* (2013.01); *G05B 13/024* (2013.01)

(58) Field of Classification Search
CPC .... F04D 13/12; F04D 15/0066; G05B 13/024
See application file for complete search history.

(56) References Cited

U.S. PATENT DOCUMENTS

| | | | |
|---|---|---|---|
| 4,990,058 A | * | 2/1991 | Eslinger .................. F04B 9/113 417/18 |
| 5,213,477 A | | 5/1993 | Watanabe et al. |

(Continued)

FOREIGN PATENT DOCUMENTS

| | | | |
|---|---|---|---|
| JP | 2005-76452 A | | 3/2005 |
| JP | 2005076452 A | * | 3/2005 |
| JP | 2014152698 A | * | 8/2014 |

OTHER PUBLICATIONS

English Translation of JP-2005076452-A obtained Dec. 1, 2022 (Year: 2005).*

(Continued)

*Primary Examiner* — Connor J Tremarche
(74) *Attorney, Agent, or Firm* — Seed Intellectual Property Law Group LLP (57) ABSTRACT

At least one computer-readable medium on which are stored instructions that, when executed by at least one processing device, enable the processing device to perform a method. The method includes determining a peak-efficiency range of a set of one or more pumps. The peak-efficiency range has an upper limit and a lower limit. The upper limit has an associated stage-down pump speed and the lower limit has an associated stage-up pump speed. The pump speed of the set of one or more pumps is determined. If the pump speed of the set of one or more pumps exceeds the stage-down pump speed, an operating pump of the set of one or more pumps is deactivated. If the pump speed of the set of one or more pumps falls below the stage-up pump speed, an operating pump is added to the set of one or more pumps.

10 Claims, 7 Drawing Sheets

(56) References Cited

U.S. PATENT DOCUMENTS

2007/0212210 A1    9/2007  Kernan et al.
2014/0140813 A1*   5/2014  Ochi .................. F04D 13/12
                                                    415/13
2017/0343267 A1   11/2017  Erpelding et al.

OTHER PUBLICATIONS

English Translation of JP-2014152698-A obtained Dec. 1, 2022 (Year: 2014).*
International Search Report, PCT/US2019/025263, mailed Jun. 17, 2019, 2 pages.
Written Opinion, PCT/US2019/025263, mailed Jun. 17, 2019, 8 pages.

* cited by examiner

IDEAL PUMP STAGING CONTROL

PRIORITY CLAIM

The present application claims priority to U.S. Provisional Patent No. 62/651,358 filed Apr. 2, 2018, which is hereby incorporated by reference as if fully set forth herein.

BACKGROUND

Existing attempts at ideal pump stage management includes staging centrifugal pumps simultaneously with other components within a dynamic fluid distribution system. The existing strategies fail to determine the dynamic conditions affecting the pumping operation when the system components are static (such as "load" side changes).

DETAILED DESCRIPTION

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Embodiments of the present invention may comprise or utilize a special-purpose or general-purpose computer including computer hardware, such as, for example, one or more processors and system memory, as discussed in greater detail below. Embodiments within the scope of the present invention also include physical and other computer-readable media for carrying or storing computer-executable instructions or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special-purpose computer.

A "network" is defined as one or more data links that enable the transport of electronic data between computer systems or modules or other electronic devices. When information is transferred or provided over a network or another communications connection (either hardwired, wireless, or a combination of hardwired or wireless) to a computer, the computer properly views the connection as a transmission medium. Transmissions media can include a network or data links which can be used to carry desired program code means in the form of computer-executable instructions or data structures and which can be accessed by a general purpose or special-purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special-purpose computer, or special-purpose processing device to perform a certain function or group of functions. In some embodiments, computer-executable instructions are executed on a general-purpose computer to turn the general-purpose computer into a special-purpose computer implementing elements of the invention. The computer executable instructions may be, for example, binaries, intermediate format instructions such as assembly language, or even source code.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

An embodiment determines the optimal conditions for changing pump stages (changing the number of operating variable-speed pumps) within a fluid distribution system utilizing, for example, centrifugal pumps. Such centrifugal pumps may be controlled by, for example, a building automation system (BAS).

Through monitoring dynamic changes within a distributed pumping system including parameters such as fluid flow, differential pressure, energy consumption, quantity of operating centrifugal pumps, and speed feedback of operating centrifugal pumps, the most efficient pump staging can be determined to meet existing flow and pressure requirements of a fluid-distribution system at any point in time.

The ideal pump stage is determined by comparing the operating conditions of each centrifugal pump with the peak-efficiency curves of the centrifugal pump. The most efficient pump stage is determined through a peak-efficiency range of the operating centrifugal pumps. The measurement instrumentation (including flow meters, differential pressure sensors, power meters, and speed feedback) measures the current conditions of the above-referenced parameters affecting operating centrifugal pumps. Calculations enable the plotting of the upper and lower limits of the peak efficiency pump curves and comparisons to the measurement data are made in order to determine if limits are exceeded. If the upper or lower limits of the peak efficiency pump curves are exceeded (therefore plotting the current operation to be out of the peak efficiency range), then a pump stage change is implemented.

"Dead bands" around the peak efficiency curves are utilized in order to ensure smooth operation of the system and allow for appropriate periods of time to expire before additional pump stages are applied (appropriate "deadbands" and "time-periods" being determined individually per system and system requirements). In other words, and in an embodiment, if the system falls above or below a predetermined level outside of one of the peak curves, the system will not over-correct by immediately shedding or bringing on a pump but rather will wait a predetermined amount of time (e.g., 5 minutes) to give the system the opportunity to right itself without bringing on or shedding a pump.

Figure 1:
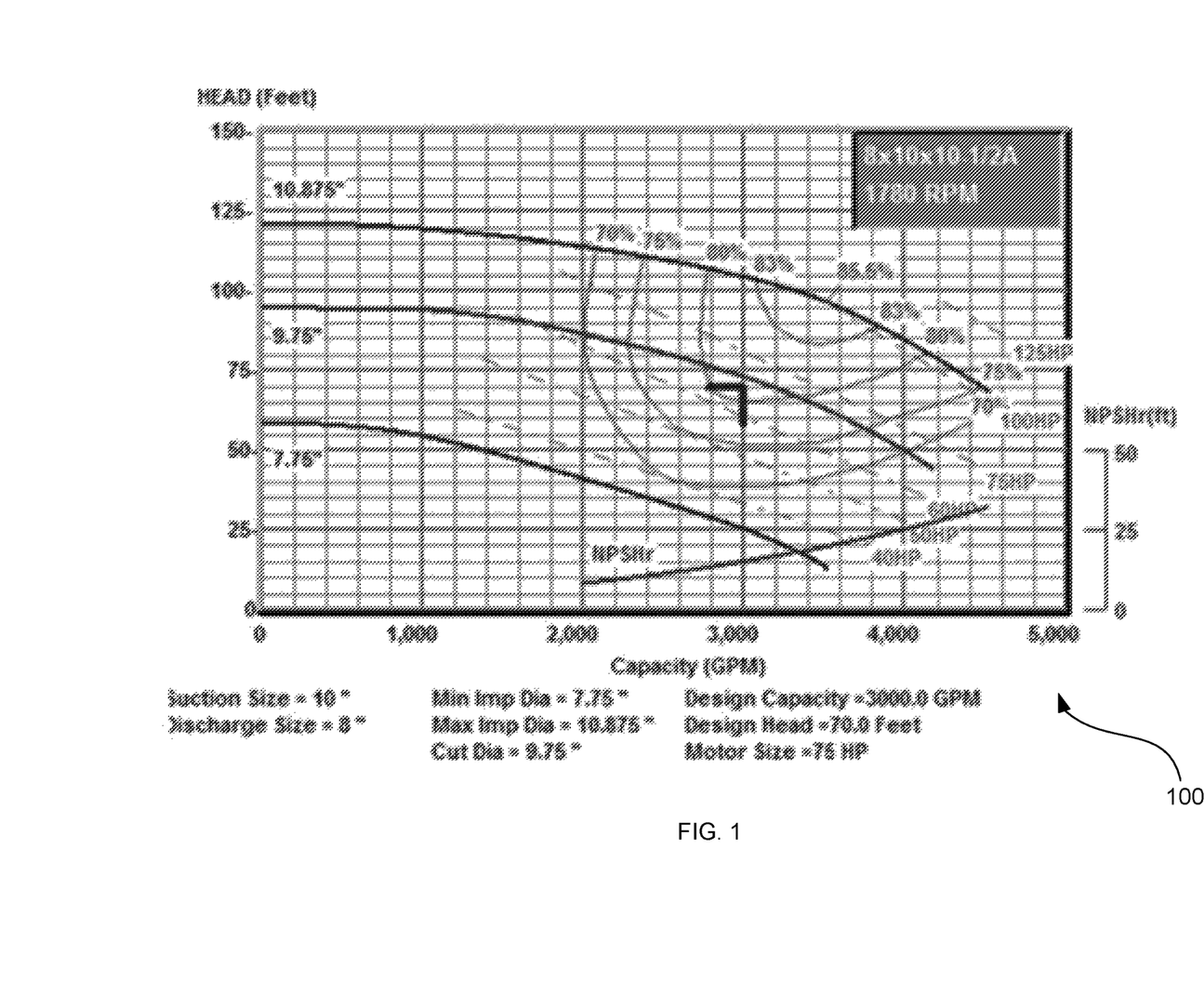
FIG. 1 illustrates a performance curve for an exemplary pump of a set of one or more pumps to be used in accordance with an embodiment of the invention.

FIG. 1 illustrates a performance curve 100 for an exemplary pump of a set of one or more pumps to be used in accordance with an embodiment of the invention. In this exemplary embodiment, the desired operational characteristics for these exemplary pumps is 3000 gallons per minute (GPM) and 70 ft. Head (HD) at 100% (full) pump set speed. Given these desired operational parameters, for a given pump and impeller size, there is a peak efficiency point that can be determined from the curve 100. In this example, and as can be seen in the curve 100, the peak efficiency of this exemplary pump with a 9.75" impeller is 81%.

Figure 2:
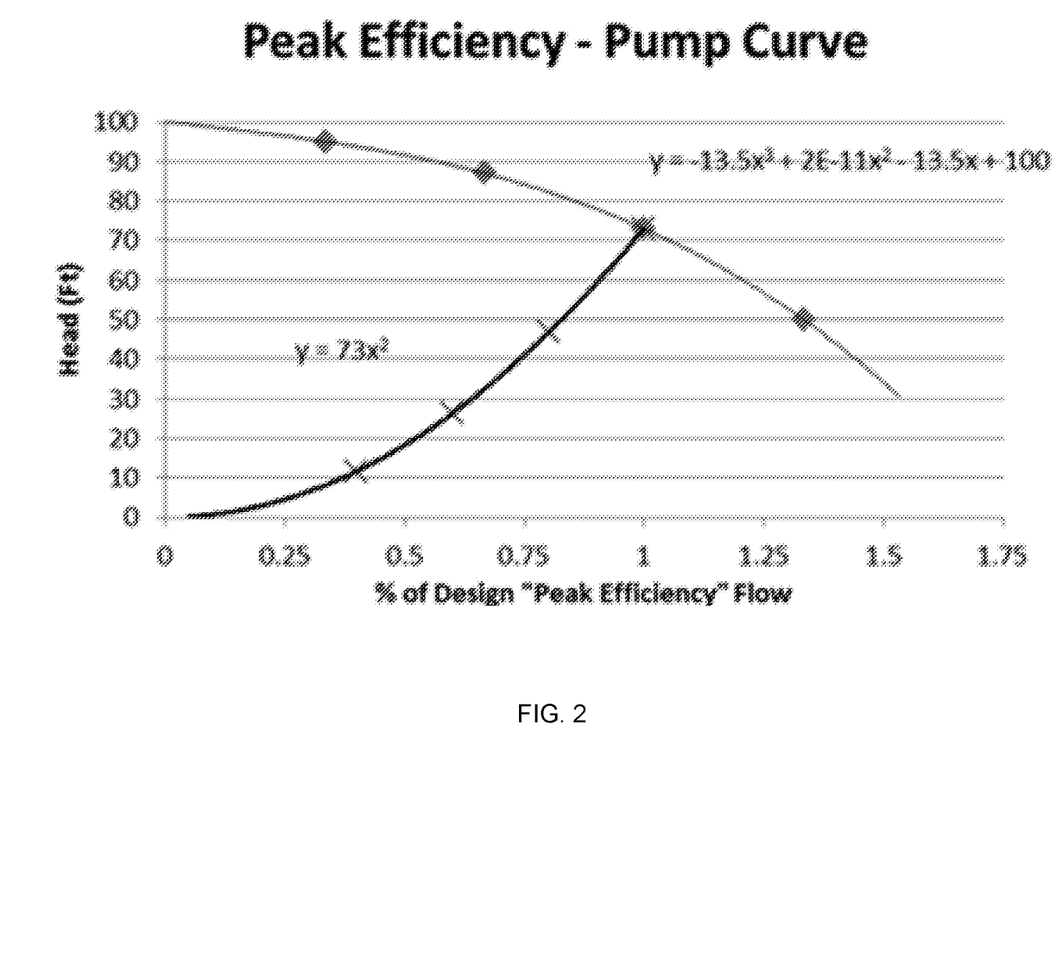
FIG. 2 illustrates an affinity curve showing the operating head and % flow relationship that maintains a pump's peak-efficiency operating point.

The pump affinity law describes the relationship of a pump's operating pressure at reduced speeds as a value of Head=Spd$^2$. The affinity curve illustrated in FIG. 2 shows the operating head and % flow relationship that maintains the pump's peak-efficiency operating point of 81%. However, this does not necessarily represent the relationship of the actual system pressure requirements as a function of the flow requirement.

Figure 3:
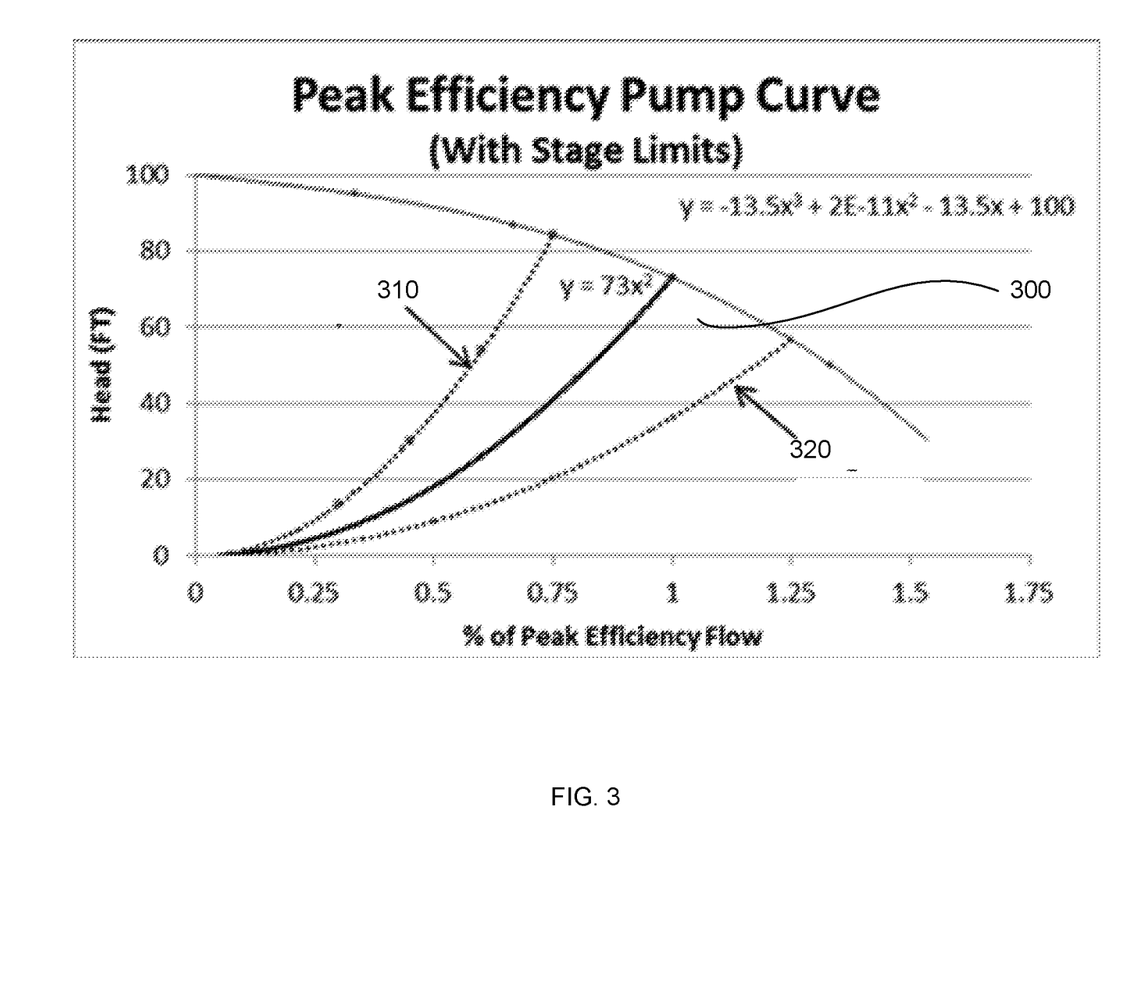
FIG. 3 illustrates an affinity curve showing a pump's peak-efficiency range.

Referring now to FIG. 3, as a result of a pumping system's dynamic changes during operation, the system curve can be either greater than or less than the operating pump's peak efficiency curve and therefore pumping efficiency is reduced. An embodiment determines a peak-efficiency range 300 defined by an upper-limit ("Shed pump") operating curve 310 and lower-limit ("Add pump") operating curve 320 in order to stage pumps to remain as close as possible to the peak efficiency.

For a given pump stage (such as one operating pump transitions to two operating pumps in parallel), the "Add pump" curve and "Shed pump" curve is defined as the point at which the efficiency remains constant on a given pump curve that when the transition is made, there is no reduction or increase in pump efficiency. Additionally, the transition point is derived such that when an additional pump operates, the total flow is divided equally among the operating pumps.

Figure 4:
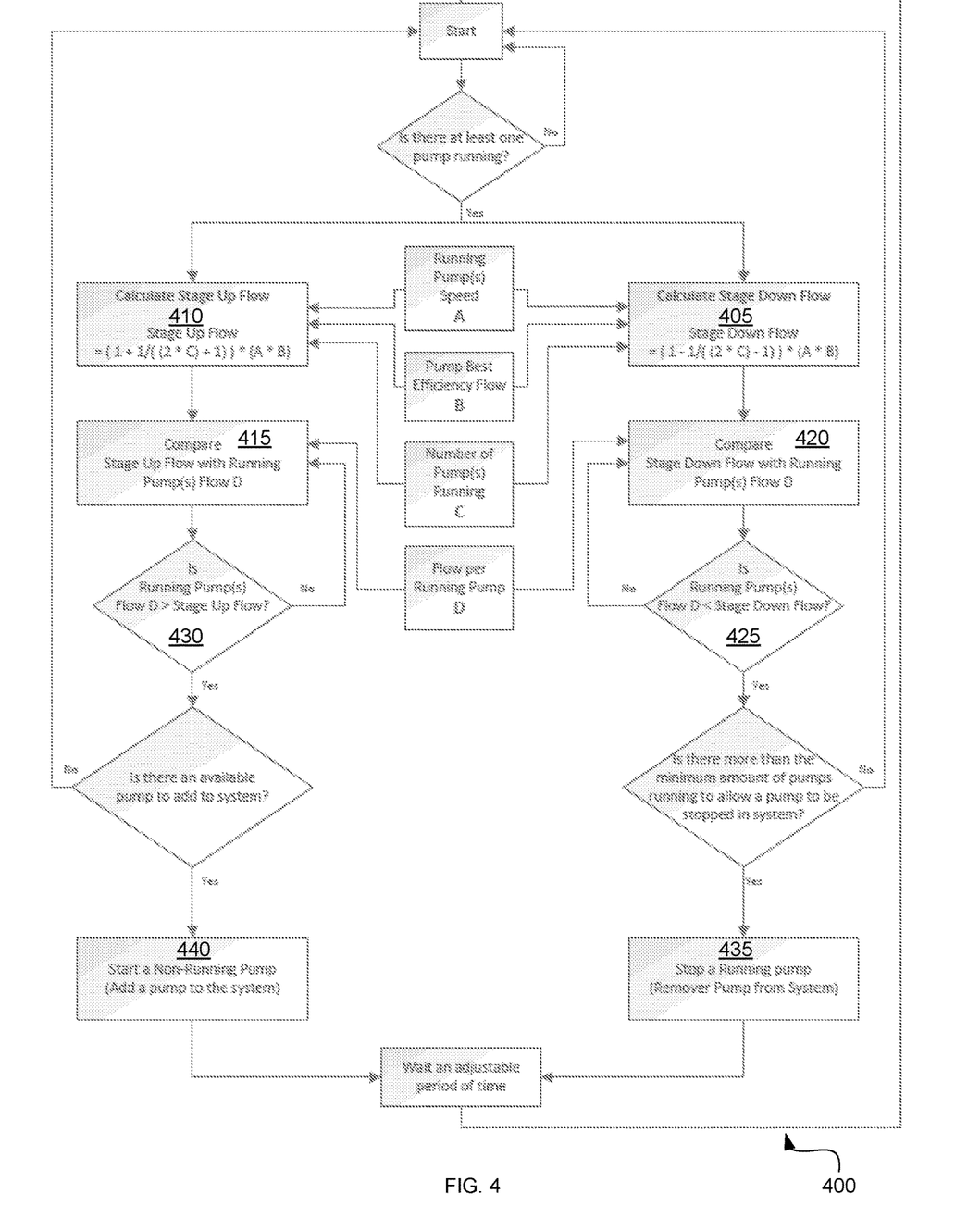
FIG. 4 illustrates a process according to an embodiment of the invention.

FIG. 4 illustrates a process 400 according to an embodiment of the invention. The process 400 is implementable in an electronic system coupled to or including a storage device. The process 400 is illustrated as a set of operations shown as discrete blocks. The process 400 may be implemented in any suitable hardware, software, firmware, or combination thereof. The order in which the operations are described is not to be necessarily construed as a limitation.

The upper limit 310 has an associated stage-down fluid-flow rate, which is determined at a block 405 according to the following Equation 1:

$$(A*B)*(1-1/(2*C)-1))$$ Eq. 1 where A is the speed at which the set of one or more pumps are operating; B is the fluid-flow rate through the set of one or more pumps when the set of one or more pumps are operating at peak efficiency and at full speed; and C is the number of the set of one or more pumps that are operating at the time of the determination made at block 405.

The lower limit 320 has an associated stage-up fluid-flow rate, which is determined at a block 410 according to the following Equation 2:

$$(A*B)*(1+1/(2*C)+1))$$ Eq. 2 where A is the speed at which the set of one or more pumps are operating; B is the fluid-flow rate through the set of one or more pumps when the set of one or more pumps are operating at peak efficiency and at full speed; and C is the number of the set of one or more pumps that are operating at the time of the determination made at block 410.

At blocks 415, 420 the fluid-flow rate through the set of one or more pumps is determined and respectively compared with the stage-up fluid-flow rate and stage-down fluid-flow rate.

At decision block 425, if the fluid-flow rate through the set of one or more pumps is determined to have fallen below the stage-down fluid-flow rate, then at block 435 an operating pump of the set of one or more pumps is deactivated.

At decision block 430, if the fluid-flow rate through the set of one or more pumps is determined to exceed the stage-up fluid-flow rate, then at block 440 an operating pump is added to the set of one or more pumps.

Figure 5:
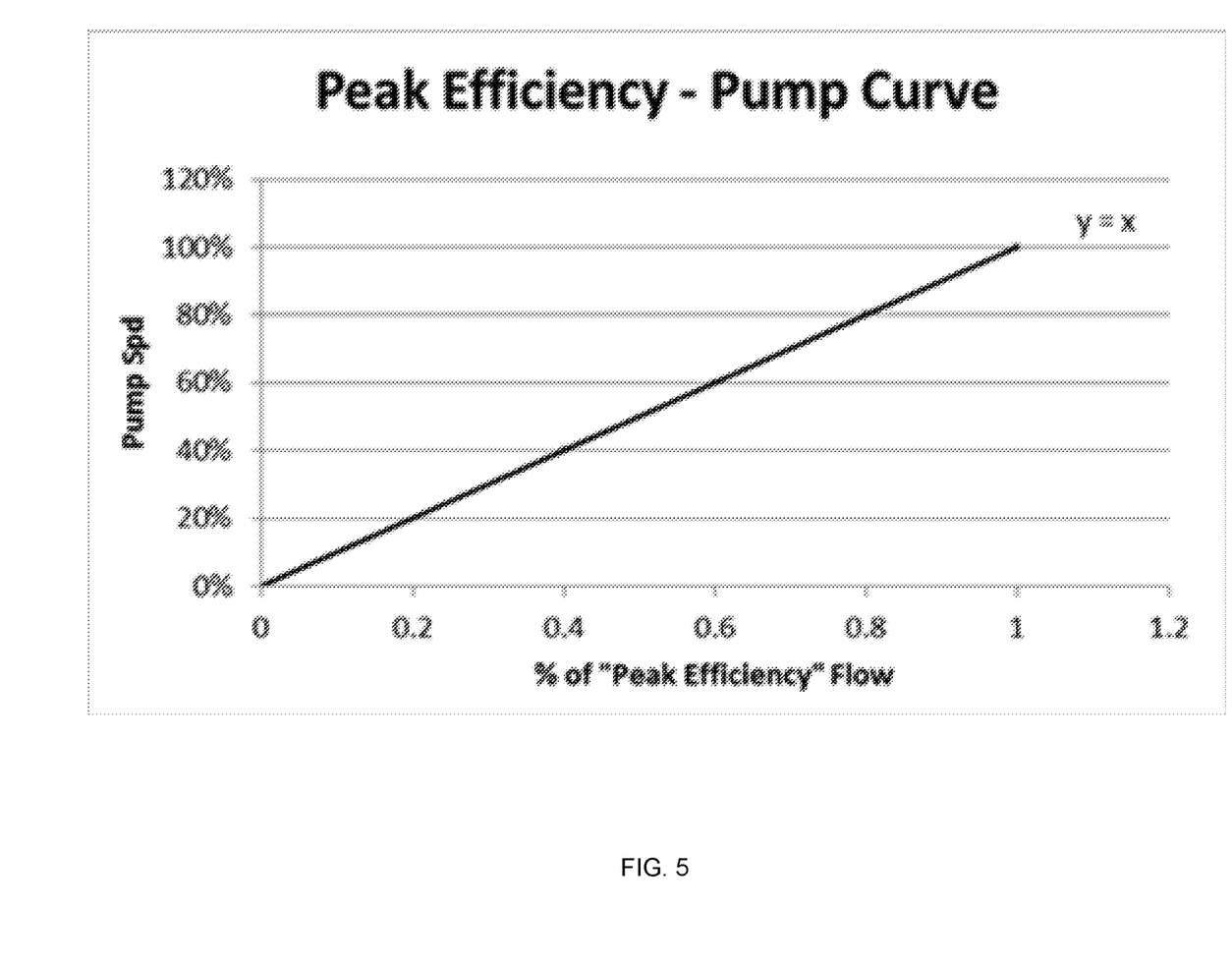
FIG. 5 illustrates an affinity curve showing the operating speed and % flow relationship that maintains a pump's peak-efficiency operating point.

The pump affinity law describes the relationship of a pump's operating flow rate at reduced speeds as a value of Flow=Spd. The affinity curve illustrated in FIG. 5 shows the operating speed and % flow relationship that maintains the pump's peak-efficiency operating point of 81%. However, this does not necessarily represent the relationship of the actual pump speed necessary to satisfy the flow requirement.

Figure 6:
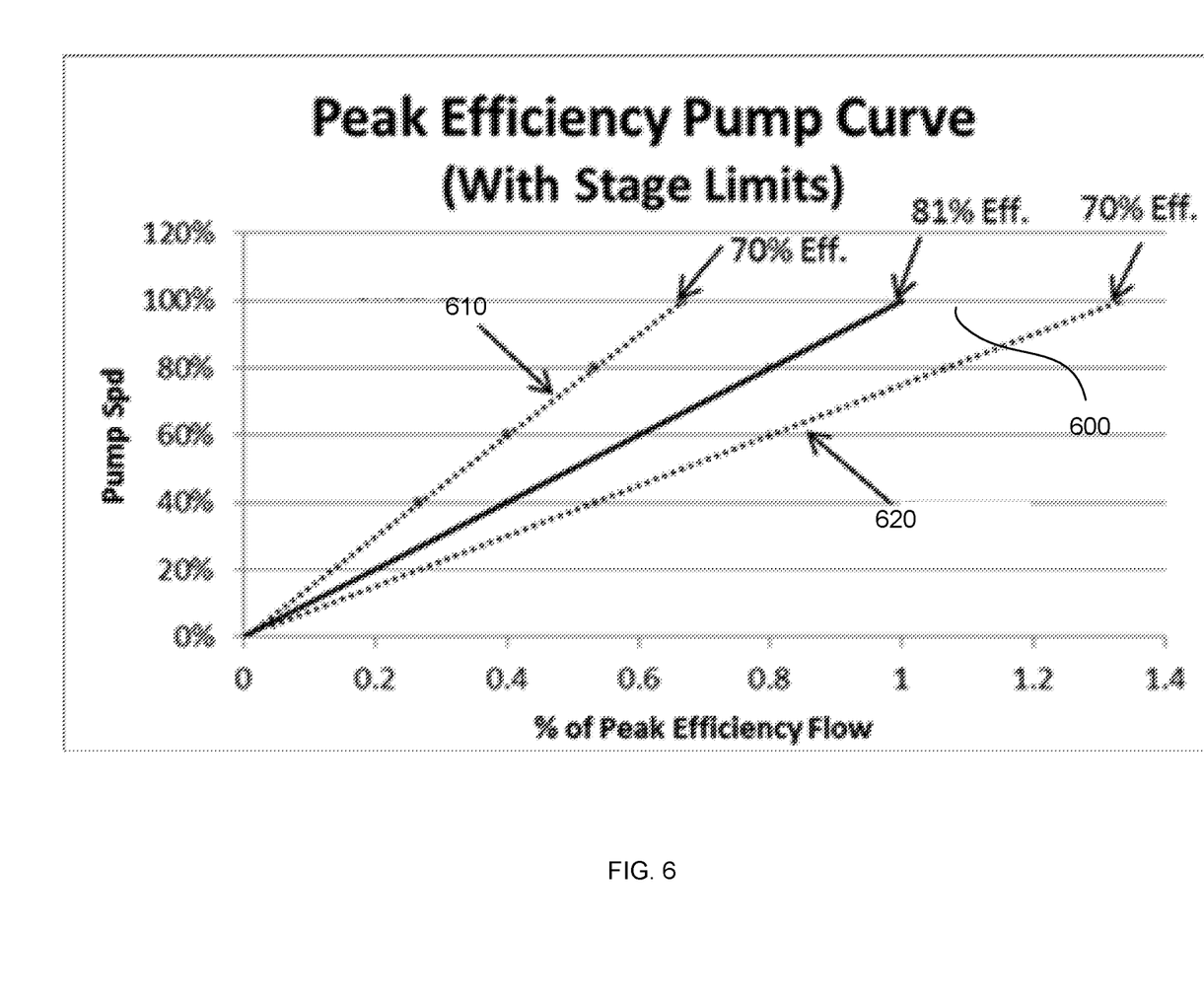
FIG. 6 illustrates an affinity curve showing a pump's peak-efficiency range.

Referring now to FIG. 6, as a result of a pumping system's dynamic changes during operation, the system curve can be either greater than or less than the operating pump's peak efficiency curve and therefore pumping efficiency is reduced. An embodiment determines a peak-efficiency range 600 defined by an upper-limit ("Shed pump") operating curve 610 and lower-limit ("Add pump") operating curve 620 in order to stage pumps to remain as close as possible to the peak efficiency.

For a given pump stage (such as one operating pump transitions to two operating pumps in parallel), the "Add pump" curve and "Shed pump" curve is defined as the point at which the efficiency remains constant on a given pump curve that when the transition is made, there is no reduction or increase in pump efficiency. Additionally, the transition point is derived such that when an additional pump operates, the total flow is divided equally among the operating pumps.

Figure 7:
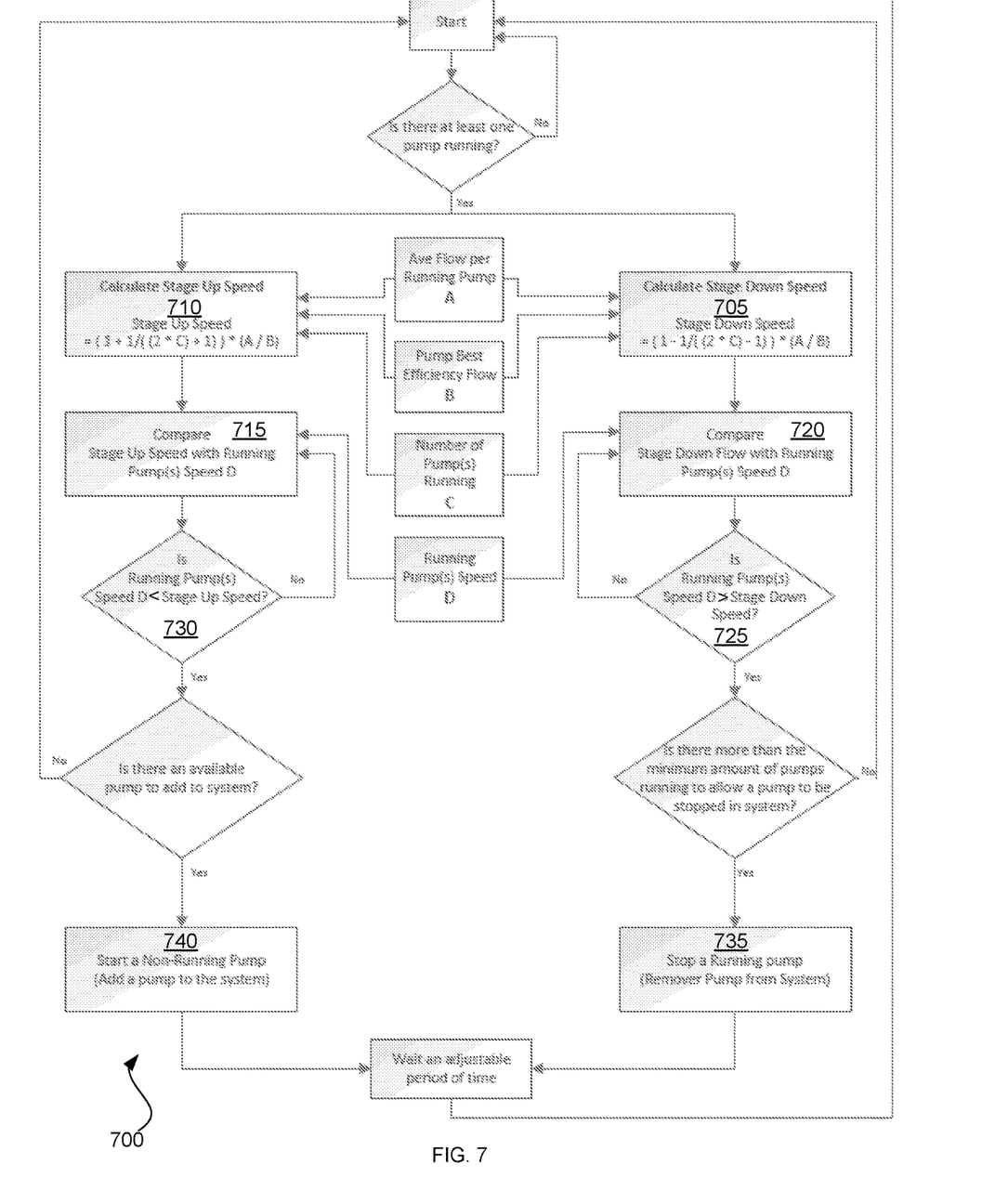
FIG. 7 illustrates a process according to an alternative embodiment of the invention.

FIG. 7 illustrates a process 700 according to an embodiment of the invention. The process 700 is implementable in an electronic system coupled to or including a storage device. The process 700 is illustrated as a set of operations shown as discrete blocks. The process 700 may be implemented in any suitable hardware, software, firmware, or combination thereof. The order in which the operations are described is not to be necessarily construed as a limitation.

The upper limit 610 has an associated stage-down pump speed, which is determined at a block 705 according to the following Equation 3:

$$(A/B)*(1-1/(2*C)-1)) \qquad \text{Eq. 3}$$

where A is the average fluid flow through each pump of the set of one or more pumps; B is the fluid-flow rate through the set of one or more pumps when the set of one or more pumps are operating at peak efficiency and at full speed; and C is the number of the set of one or more pumps that are operating at the time of the determination made at block 705.

The lower limit 620 has an associated stage-up pump speed, which is determined at a block 710 according to the following Equation 4:

$$(A/B)*(1+1/(2*C)+1)) \qquad \text{Eq. 4}$$

where A is the average fluid flow through each pump of the set of one or more pumps; B is the fluid-flow rate through the set of one or more pumps when the set of one or more pumps are operating at peak efficiency and at full speed; and C is the number of the set of one or more pumps that are operating at the time of the determination made at block 710.

At blocks 715, 720 the pump speed of the set of one or more pumps is determined and respectively compared with the stage-up pump speed and stage-down pump speed.

At decision block 725, if the pump speed of the set of one or more pumps is determined to exceed the stage-down pump speed, then at block 735 an operating pump of the set of one or more pumps is deactivated.

At decision block 730, if the pump speed of the set of one or more pumps is determined to have fallen below the stage-up pump speed, then at block 740 an operating pump is added to the set of one or more pumps.

While the preferred embodiment of the disclosure has been illustrated and described, as noted above, many changes can be made without departing from the spirit and scope of the disclosure. Accordingly, the scope of the described systems and techniques is not limited by the disclosure of the preferred embodiment. Instead, the described systems and techniques should be determined entirely by reference to the claims that follow.

What is claimed is:

1. At least one computer-readable medium on which are stored instructions that, when executed by at least one processing device, enable the processing device to perform a method, the method comprising the steps of:
   determining a peak-efficiency range of one or more operating pumps in a plurality of pumps, the peak-efficiency range having an upper limit and a lower limit, the upper limit having an associated stage-down fluid-flow rate threshold and the lower limit having an associated stage-up fluid-flow rate threshold;
   determining a fluid-flow rate through the one or more operating pumps;
   if the fluid-flow rate through the one or more operating pumps falls below the stage-down fluid-flow rate threshold, deactivating a pump of the one or more operating pumps; and
   if the fluid-flow rate through the one or more operating pumps exceeds the stage-up fluid-flow rate threshold, adding a pump of the plurality of pumps to the one or more operating pumps,
   wherein the stage-up fluid-flow rate threshold is periodically determined as a function of:
   a reference fluid-flow rate through the one or more operating pumps when the one or more operating pumps are operating at peak efficiency and at full speed;
   a count of the one or more operating pumps; and
   a speed at which the one or more operating pumps are currently operating; and
   wherein the stage-down fluid-flow rate threshold is periodically determined as a function of:
   the reference fluid-flow rate through the one or more operating pumps when the one or more operating pumps are operating at peak efficiency and at full speed;
   a count of the one or more operating pumps; and
   a speed at which the one or more operating pumps are currently operating.

2. The medium of claim 1, wherein the peak-efficiency range is determined from a peak-efficiency curve.

3. The medium of claim 1, wherein the stage-down fluid-flow rate threshold is a function of the average fluid flow through each pump of the one or more operating pumps.

4. The medium of claim 1, wherein the stage-up fluid-flow rate threshold is a function of the average fluid flow through each pump of the one or more operating pumps.

5. The medium of claim 1, wherein the method further comprises delaying the activation or addition of an operating pump for a predetermined amount of time after determining the fluid-flow rate through the one or more operating pumps.

6. At least one computer-readable medium on which are stored instructions that, when executed by at least one processing device, enable the processing device to perform a method, the method comprising the steps of:
- determining a peak-efficiency range of one or more operating pumps in a plurality of pumps, the peak-efficiency range having an upper limit and a lower limit, the upper limit having an associated stage-down pump speed threshold and the lower limit having an associated stage-up pump speed threshold;
- determining a speed at which the one or more operating pumps are currently operating;
- if the speed of the one or more operating pumps exceeds the stage-down pump speed threshold, deactivating a pump in the one or more operating pumps; and
- if the pump speed of the one or more operating pumps falls below the stage-up pump speed threshold, adding a pump of the plurality of pumps to the one or more operating pumps,
- wherein the stage-up pump speed threshold is periodically determined as a function of:
  - a reference fluid-flow rate through the one or more operating pumps when the one or more operating pumps are operating at peak efficiency and at full speed;
  - a count of the one or more operating pumps; and
  - a fluid-flow rate of the one or more operating pumps currently operating; and
- wherein the stage-down pump speed threshold is periodically determined as a function of:
  - the reference fluid-flow rate through the one or more operating pumps when the one or more operating pumps are operating at peak efficiency and at full speed;
  - a count of the one or more operating pumps; and
  - a fluid-flow rate of the one or more operating pumps currently operating.

7. The medium of claim 6, wherein the peak-efficiency range is determined from a peak-efficiency curve.

8. The medium of claim 6, wherein the stage-up pump speed threshold is a function of the average fluid flow through each pump of the one or more operating pumps.

9. The medium of claim 6, wherein the stage-down pump speed threshold is a function of the average fluid flow through each pump of the one or more operating pumps.

10. The medium of claim 6, wherein the method further comprises delaying the activation or addition of an operating pump for a predetermined amount of time after determining the fluid-flow rate through the one or more operating pumps.

* * * * *